(No Model.)  4 Sheets—Sheet 1.
T. J. HATHAWAY.
SEED PLANTER.
No. 499,110.  Patented June 6, 1893.
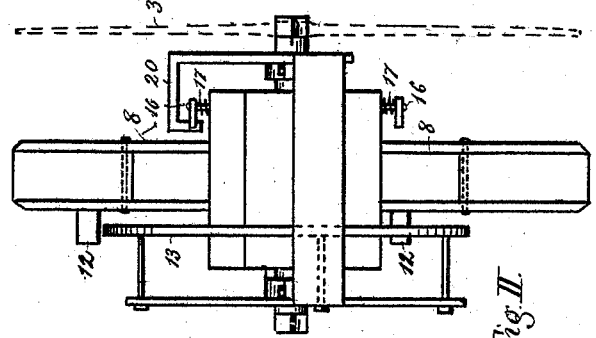
Fig. II.
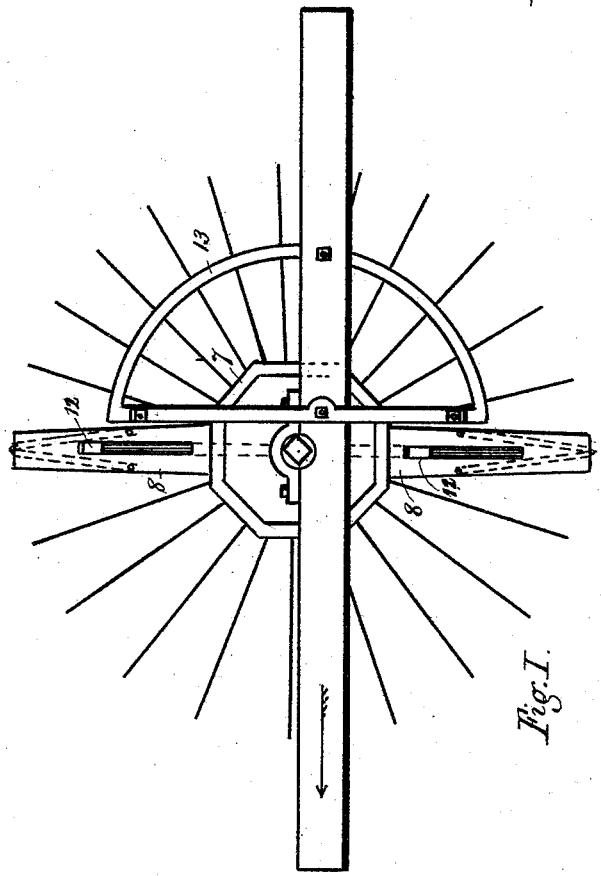
Fig. I.
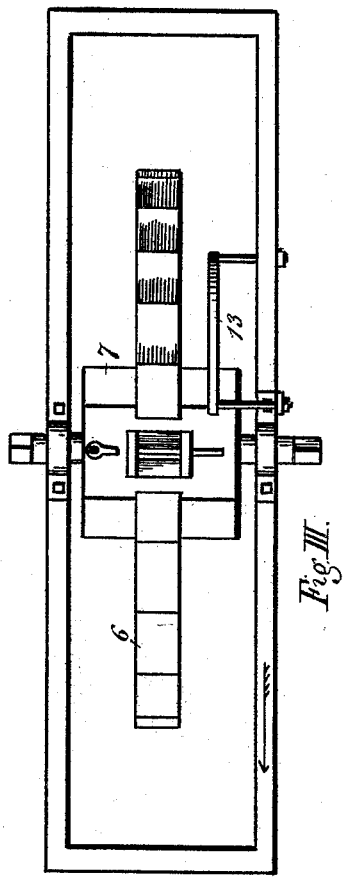
Fig. III.
Witnesses.
R. S. Millar
L. M. Adams
Inventor
T. J. Hathaway
By J. Bailey Atty (No Model.) 4 Sheets—Sheet 2.
T. J. HATHAWAY.
SEED PLANTER.
No. 499,110. Patented June 6, 1893.
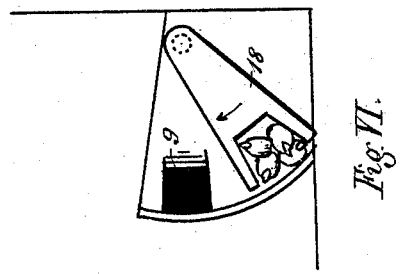
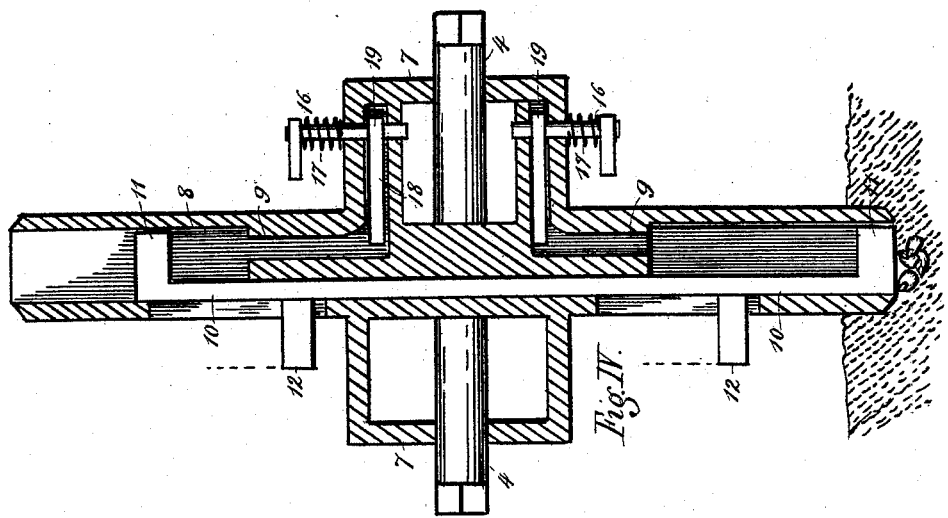
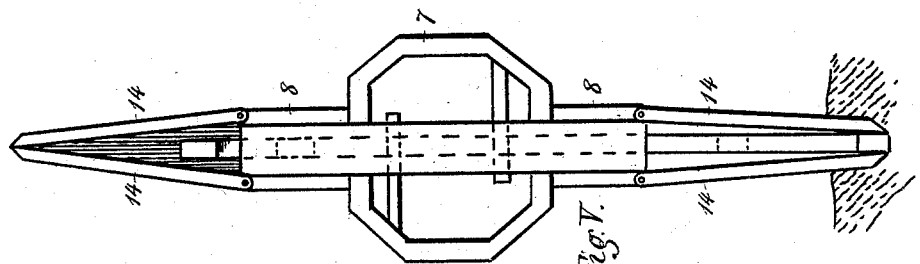
Witnesses
R. S. Millar
L. M. Adams
Inventor
T. J. Hathaway
B. J. Bailey Atty (No Model.) 4 Sheets—Sheet 3.
T. J. HATHAWAY.
SEED PLANTER.
No. 499,110. Patented June 6, 1893.
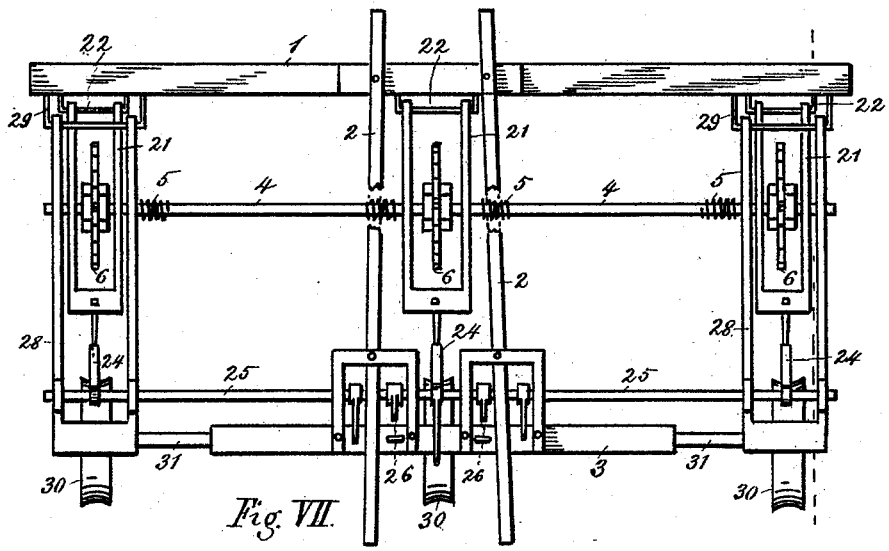
Fig. VII.
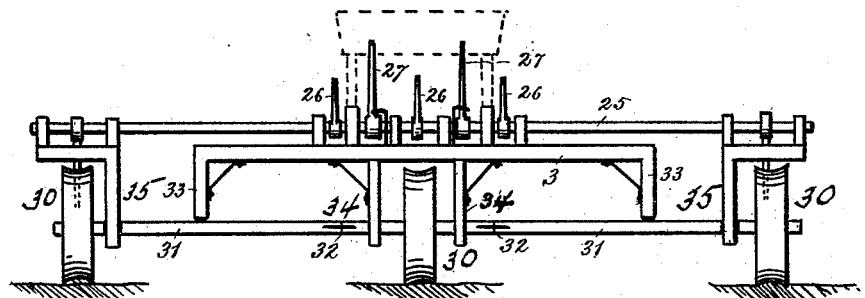
Fig. VIII.
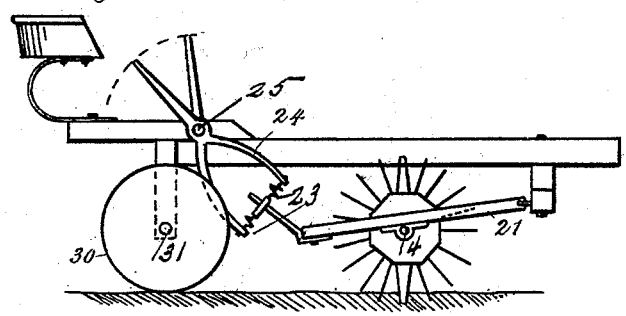
Fig. IX.
Witnesses
R. S. Millar
L. M. Adams
Inventor
T. J. Hathaway
J. J. Bailey Atty (No Model.) 4 Sheets—Sheet 4.
T. J. HATHAWAY.
SEED PLANTER.
No. 499,110. Patented June 6, 1893.
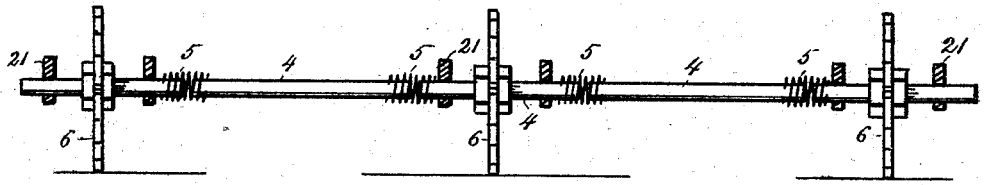
Fig. X.
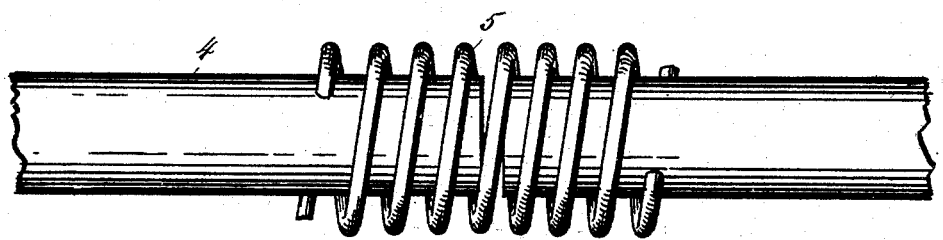
Fig. XI.
Witnesses
A. S. Millar
L. M. Adams
Inventor
T. J. Hathaway
By J. J. Bailey Atty

UNITED STATES PATENT OFFICE.

THOMAS J. HATHAWAY, OF MONTEVALLO, MISSOURI.

SEED-PLANTER.

SPECIFICATION forming part of Letters Patent No. 499,110, dated June 6, 1893.

Application filed September 24, 1892. Serial No. 446,791. (No model.)

*To all whom it may concern:*

Be it known that I, THOMAS J. HATHAWAY, a citizen of the United States, residing at Montevallo, in the county of Vernon and State of Missouri, have invented a new and useful Improvement in Seed-Planters, which improvement is fully set forth in the following specification and accompanying drawings, in which—

Figure 1 is a side elevation of my improved planting wheel; Fig. 2, a rear elevation of the same; Fig. 3, a top view; Fig. 4, a vertical transverse section showing the seed-box and the dropping mechanism; Fig. 5, a side view of the seed-box, the recesses therein and the hinged jaws of the seed dropper; Fig. 6, a detail view of the swinging arm which receives the seed from the box and conveys it into the seed ducts; Fig. 7, a plan view of the machine; Fig. 8, a rear elevation; Fig. 9, an end view showing the relation of the planting wheel with the swinging yoke and the forked hoisting lever. Figs. 10 and 11, are details showing different views of the divided axle and the springs on same.

My invention relates to improvements in seed-planting machinery, and its object is to construct a three wheel seed-planter combining lightness of draft, certainty of action and exceptional capacity for work with special means for adapting its operation to undulating ground.

The device consists essentially of planting wheels having enlarged hubs forming seed boxes provided with dropping mechanism by which the seed may be regularly discharged and deposited at predetermined intervals: a main axle composed of sections connected by spring joints: covering wheels also provided with flexible axles and means for elevating the planting wheels singly or simultaneously as may be desired.

Referring to the accompanying drawings, 1 represents the front bar, which with the connecting beams 2 and rear bar 3 constitute the fixed frame of the planter. The main axle 4 consists of three sections which are united by coiled spring joints 5. It will be understood that the axle is thus made both flexible and extensible and if either of the wheels should pass over an undulation the nearest section of the axle would yield to the pressure and the operation of the other wheels would not be affected. The planting wheels 6 are provided with spokes having their outer ends pointed in order to prevent a sliding motion and also to guard against an accumulation of soil on the periphery of the wheel and a consequent enlargement thereof thereby causing a diversity in the operation of the several wheels which are designed to revolve in unison. The hub of the wheel is enlarged and forms a seed box 7 which insures a thorough agitation of the seed while the machine is in operation. A chambered box 8 extends diametrically through the planting wheel and is provided with seed ducts or chutes 9 which communicate with the seed box, and also with a channel for a reciprocating plunger 10 having right angled extensions or heads 11, which alternately open and close the outer ends of the seed ducts. The plunger is also provided with lugs 12 which alternately engage the stationary guide 13. As the wheel revolves, the plunger is thus gradually raised until it reaches a vertical position. It is then released and drops to its lowest position. The outer ends of the chambered box are provided with hinged jaws 14 which may be kept normally closed by curved springs. Spindles 16 provided with coiled springs 17 extend through the shell of the hub or seed box and carry bifurcated arms 18 which oscillate alternately in and out of recesses 19. These arms are actuated by tripping levers 20 which engage lugs attached to the tops of the spindles. The seed is thus conveyed from the seed box into the ducts and falls into closed jaws 14. The plunger then descends, the hinged jaws are opened and the seed is driven into the soil.

The main axle 4 is journaled in yokes 21 which are hinged on stirrups 22 attached to the front bar. The rear ends of the yokes oscillate vertically on coiled springs 23 which are carried by forked levers 24 attached to the shaft 25. This shaft is made flexible in the same manner as the main axle and is controlled by the driver of the machine by means of hand levers 26. If it be desired to raise all the planting wheels when the machine is turning corners or being moved from place to place, I provide supplementary levers 27 which may be locked under hooks attached to the cross bar 3. The lever shaft 25 is journaled in yokes 28 having their front ends hinged on stirrups 29 attached to the front bar 1 above the main axle yokes. It will be observed that the axle yokes 21 being narrower have free vertical movement within the yokes 28. The covering wheels 30 are journaled on an axle 31 which is made vertically flexible by hinged joints 32. Dependent arms 33 are attached to the ends of the cross bar 3 and form fulcrums which rest on the axle 31. Vertical bars 34 and 35 are attached respectively to the cross bar and to the heads of the yokes 28. The lower ends of the bars are slotted and engage gained recesses in the axle. The slots extend a sufficient distance above the ends of the arms to permit a limited vertical movement of the axle when the covering wheels pass over undulations or uneven surfaces. A marking bar 36 is attached to the end of the main axle.

In view of the fact that planting machines as hitherto constructed are necessarily confined to the use of two planting wheels, it will be understood that the peculiar construction of my device renders it practicable to employ three or more such wheels thereby providing greatly increased capacity in addition to greater facility and certainty of operation.

What I claim as new is—

1. In a three row seed planter, the combination with the herein described planting wheels of vertically swinging yokes adapted to carry the planting wheels; a main axle journaled in said yokes and composed of sections united at their ends by coiled spring joints whereby the axle is made flexible and extensible, substantially as and for the purpose herein set forth.

2. In a three row seed-planter the combination with the herein described planting wheels, the flexible and extensible main axle and the vertically swinging yokes of a flexible and extensible shaft axle journaled in a second series of vertically swinging yokes and attached to the main axle yokes by spring connections and provided with levers whereby the planting wheels may be lifted out of contact with the ground, substantially as herein set forth.

3. In a three row seed-planter, the planting wheels, the vertically swinging yokes, the flexible and extensible main and shaft axles and the second series of vertically swinging yokes in combination with a flexible covering wheel axle having a limited vertical movement on slotted arms attached to the rear ends of the second series of swinging yokes and to the rear cross bar of the fixed frame of the machine, substantially as herein described.

In testimony that I claim the foregoing I have hereunto set my hand, this 10th day of March, 1892, in the presence of witnesses.

THOMAS J. HATHAWAY.

Witnesses:
M. A. PINKERTON,
R. B. THOMPSON.